(12) United States Patent
Marsh

(10) Patent No.: US 7,885,971 B2
(45) Date of Patent: Feb. 8, 2011

(54) METHODS AND SYSTEMS FOR GENERATING ELECTRONIC PROGRAM GUIDES

(75) Inventor: David J. Marsh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/036,988

(22) Filed: Feb. 25, 2008

(65) Prior Publication Data

US 2008/0147650 A1    Jun. 19, 2008

Related U.S. Application Data

(62) Division of application No. 10/165,727, filed on Jun. 6, 2002.

(51) Int. Cl.
G06F 7/00 (2006.01)
G06F 17/00 (2006.01)

(52) U.S. Cl. .................. 707/770; 707/803; 707/812; 725/39

(58) Field of Classification Search ......... 707/600–831; 725/9, 37, 139–142, 46, 47, 153
See application file for complete search history.

(56) References Cited

U.S. PATENT DOCUMENTS

| 4,706,121 A | 11/1987 | Young |
| 5,410,344 A | 4/1995 | Graves et al. |
| 5,844,620 A | 12/1998 | Coleman et al. |
| 5,969,748 A | 10/1999 | Casement et al. |
| 5,973,683 A | 10/1999 | Cragun et al. |
| 5,995,133 A | 11/1999 | Kim |
| 6,005,597 A | 12/1999 | Barrett et al. |
| 6,115,057 A | 9/2000 | Kwoh et al. |
| 6,157,411 A | 12/2000 | Williams et al. |
| 6,317,885 B1 | 11/2001 | Fries |
| 6,457,010 B1 | 9/2002 | Eldering et al. |
| 6,614,987 B1 | 9/2003 | Ismail et al. |

(Continued)

FOREIGN PATENT DOCUMENTS

JP    2000067060    3/2000

(Continued)

OTHER PUBLICATIONS

Vuorimaa et al., XML based text TV, 2000, IEEE, 109-113.*

(Continued)

Primary Examiner—Jean B Fleurantin
(74) Attorney, Agent, or Firm—Lee & Hayes, PLLC

(57) ABSTRACT

Various embodiments provide ways to collect, organize, and process metadata associated with particular instances of media content. Metadata can be collected from a variety of metadata providers and organized in individual content folders that can be provided to various client devices. The client devices can process the content folders to provide an electronic program guide for its users. Methods and systems can also make use of user-specific data to evaluate various media content and then make recommendations as to which content a user would most likely wish to experience. Such user-specific data can comprise one or more user preference files that contain information associated with individual users, and one or more significance files that hold values, for individual users, that can be used to determine the significance of any matches found between the user preference files and media content.

17 Claims, 9 Drawing Sheets

U.S. PATENT DOCUMENTS

| | | | |
|---|---|---|---|
| 6,651,253 | B2 | 11/2003 | Dudkiewicz et al. |
| 6,698,020 | B1 | 2/2004 | Zigmond et al. |
| 6,704,491 | B1 | 3/2004 | Revis |
| 6,704,931 | B1 | 3/2004 | Schaffer et al. |
| 6,842,761 | B2 | 1/2005 | Diamond et al. |
| 6,851,090 | B1 | 2/2005 | Gutta et al. |
| 6,931,657 | B1 * | 8/2005 | Marsh .................. 725/46 |
| 6,938,208 | B2 | 8/2005 | Reichardt |
| 6,973,665 | B2 | 12/2005 | Dudkiewicz et al. |
| 6,990,677 | B1 | 1/2006 | Pietraszak et al. |
| 7,185,355 | B1 | 2/2007 | Ellis et al. |
| 7,246,128 | B2 | 7/2007 | Jordahl |
| 2001/0021995 | A1 | 9/2001 | Hatano |
| 2001/0041980 | A1 | 11/2001 | Howard et al. |
| 2002/0042923 | A1 | 4/2002 | Asmussen et al. |
| 2002/0059603 | A1 | 5/2002 | Kelts |
| 2002/0073008 | A1 | 6/2002 | Dutta et al. |
| 2002/0104087 | A1 | 8/2002 | Schaffer et al. |
| 2002/0129375 | A1 | 9/2002 | Kim et al. |
| 2002/0140719 | A1 | 10/2002 | Amir et al. |
| 2002/0144262 | A1 | 10/2002 | Plotnick et al. |
| 2002/0147984 | A1 | 10/2002 | Tomsen et al. |
| 2002/0152463 | A1 | 10/2002 | Dudkiewicz |
| 2003/0018977 | A1 | 1/2003 | McKenna |
| 2003/0023537 | A1 | 1/2003 | Joshi et al. |
| 2003/0066077 | A1 | 4/2003 | Gutta et al. |
| 2003/0093694 | A1 | 5/2003 | Medvinsky et al. |
| 2003/0093793 | A1 | 5/2003 | Gutta |
| 2003/0131355 | A1 | 7/2003 | Berenson et al. |
| 2003/0135857 | A1 | 7/2003 | Pendakur et al. |
| 2003/0144922 | A1 | 7/2003 | Schrantz |
| 2004/0041980 | A1 | 3/2004 | Laguette et al. |
| 2005/0004978 | A1 | 1/2005 | Reed et al. |
| 2005/0028194 | A1 | 2/2005 | Elenbaas et al. |
| 2005/0172318 | A1 | 8/2005 | Dudkiewicz et al. |
| 2005/0192987 | A1 | 9/2005 | Marsh |
| 2005/0210502 | A1 | 9/2005 | Flickinger et al. |
| 2006/0190966 | A1 | 8/2006 | McKissick et al. |
| 2006/0271958 | A1 | 11/2006 | Ukai et al. |
| 2008/0216115 | A1 | 9/2008 | Kikinis |

FOREIGN PATENT DOCUMENTS

| | | |
|---|---|---|
| JP | 2001134582 | 5/2001 |
| WO | WO0040026 | 7/2000 |
| WO | WO0147257 | 6/2001 |
| WO | WO0211445 | 2/2002 |

OTHER PUBLICATIONS

Sato et al., An impression-based retrieval system of music collection, Aug. 30, 2000, IEEE, vol. 2, 856-859.*

Ogawa et al., Template-based, format-extensible authoring for BS digital data broadcast service, 2001, IEEE, 207-212.*

U.S. Appl. No. 11/119,170, filed Apr. 29, 2005, Marsh, David, "Media Content Descriptions".

Adami, et al., "The ToCAI Description Scheme for Indexing and Retrieval of Multimedia Documents", vol. 14, issue 2, Kluwer Academic Publishers, 2001, pp. 153-173.

Evain, "TV-Anytime Metadata, A Preliminary Specification On Schedule", EBU Technical Department, Sep. 28, 2000, pp. 14.

Herla, "Online-Archive-MIT Metadaten Zum Erfolg" vol. 45, No. 1, Nov. 26, 2000, pp. 8-15.

Jasinschi, et al., "Automatic TV Program Genre Classification Based on Audio Patterns", IEEE 2001, pp. 6.

Jong, et al., "Die technische Fachzeitschrift fur Fernsehen, Film und elektronische Medien", Fernseh-Und Kino-Technik, 2001, pp. 10.

Joung, et al., "A Metadata Repository System For An Efficient Description Of Visual Multimedia Documents", Concurrent Engineering, Research and Applications, vol. 9, No. 2, Jun. 2001, Technomic Publishing Co. 2001 pp. 93-104.

Liu, et al., "Classifying Video Documents By Hierarchical Structure Of Video Contents", vol. 43, No. 5, The Computer Journal, 2000, pp. 15.

McDonald, et al., "Online Television Library: Organisation and Content Browsing for General Users", Proceedings of SPIE, 2001, pp. 311-319.

"Merriam Websters Collegiate Dictionary Tenth Edition", Merriam Websters, Incorprated, 2001, pp. 3.

Mulder, "The Integration Of Metadata from Production To Consumer", EBU Technical Review, Sep. 2000, pp. 5.

Taskiran, et al., "Discovering Video Structure Using The Psuedo-Semantic Trace", vol. 4315, Proceedings of SPIE, 2001, pp. 8.

Truong, et al., "Automatic Genre Identification for Content-Based Video Categorization", IEEE, 2000, pp. 4.

Wei, et al., "TV Program Classification Based on Face and Text Processing", vol. 3, IEEE, 2000, pp. 1345-1348.

* cited by examiner

METHODS AND SYSTEMS FOR GENERATING ELECTRONIC PROGRAM GUIDES

RELATED APPLICATIONS

This application is a divisional of and claims priority to U.S. patent application Ser. No. 10/165,727, which was filed Jun. 6, 2002, the disclosure of which is incorporated by reference herein.

This application is also related to the following U.S. patent applications, the disclosures of which are incorporated by reference herein:

application Ser. No. 10/125,260, filed Apr. 16, 2002, entitled "Media Content Descriptions" and naming Dave Marsh as inventor, now U.S. Pat. No. 7,073,193;

application Ser. No. 10/125,259, filed Apr. 16, 2002, entitled "Describing Media Content in Terms of Degrees" and naming Dave Marsh as inventor;

application Ser. No. 10/160,932, filed May 31, 2002, entitled "Scoring And Recommending Media Content Based On User Preferences", and naming Dave Marsh as inventor; and application Ser. No. 10/160,919, filed May 31, 2002, entitled "Entering Programming Preferences While Browsing An Electronic Programming Guide", and naming Dave Marsh as inventor.

TECHNICAL FIELD

This invention relates to media entertainment systems and, in particular, to systems and methods that are directed to personalizing a user's experience.

BACKGROUND

Many media entertainment systems provide electronic programming guides (EPGs) that allow users to interactively select programs that they are interested in. Systems that employ EPG technology typically display programs organized according to the channel on which the program will be broadcast and the time at which the broadcast will occur. Information identifying a particular program typically includes the program title, and possibly a short description of the program. In today's world, media entertainment systems can typically offer hundreds of channels from which a user can choose. In the future, many more channels will undoubtedly be offered. This alone can present a daunting task for the user who wishes to locate particular programs of interest. Further complicating the user's experience is the fact that many current electronic programming guides (EPGs) can provide an abundance of information that can take several hours for a user to look through.

Against this backdrop, what many viewers typically end up doing is that they simply review a few favorite channels to see when their favorite programs are playing, and then view those programs at the appropriate times. Additionally, other viewers may simply revert to channel surfing. Needless to say, these outcomes do not provide the user with the best user experience or make effective and efficient use of the user's time.

Accordingly, this invention arose out of concerns associated with providing improved systems and methods that can provide media entertainment users with a rich, user-specific experience.

SUMMARY

Various embodiments provide ways to collect, organize, and process metadata associated with particular instances of media content. Metadata can be collected from a variety of metadata providers and organized in individual content folders that can be provided to various client devices. The client devices can process the content folders to provide an electronic program guide for its users. The content folders can, but need not, contain the media content to which the metadata pertains.

Methods and systems can also make use of user-specific data to evaluate various media content and then make recommendations as to which content a user would most likely wish to experience. Such user-specific data can comprise one or more user preference files that contain information associated with individual users, and one or more significance files that hold values that can be used to determine the significance of any matches found between the user preference files and media content. In some embodiments, a recommendation engine processes content description data and user-specific data to make recommendations as to which content a particular user would most likely wish to experience.

DETAILED DESCRIPTION

Overview

Various embodiments discussed below provide ways to collect, organize, and process metadata associated with particular instances of media content. Collection and organization of the metadata can take place in a manner that is dynamic in the sense that collection and organization efforts can continue over time—even after the media content is created. Thus, a very rich and robust collection of metadata can be generated. This rich collection of metadata can be provided to client devices that are used by users to experience the media content. Presentation and access to the metadata can typically take place via an electronic program guide (EPG) that displays or otherwise makes available the metadata. Through the techniques described below, the user can be exposed to an experience that is not only rich, but which can be very specifically tailored to incorporate the user's likes and preferences as well.

Content Description Metadata Collection

Figure 1:
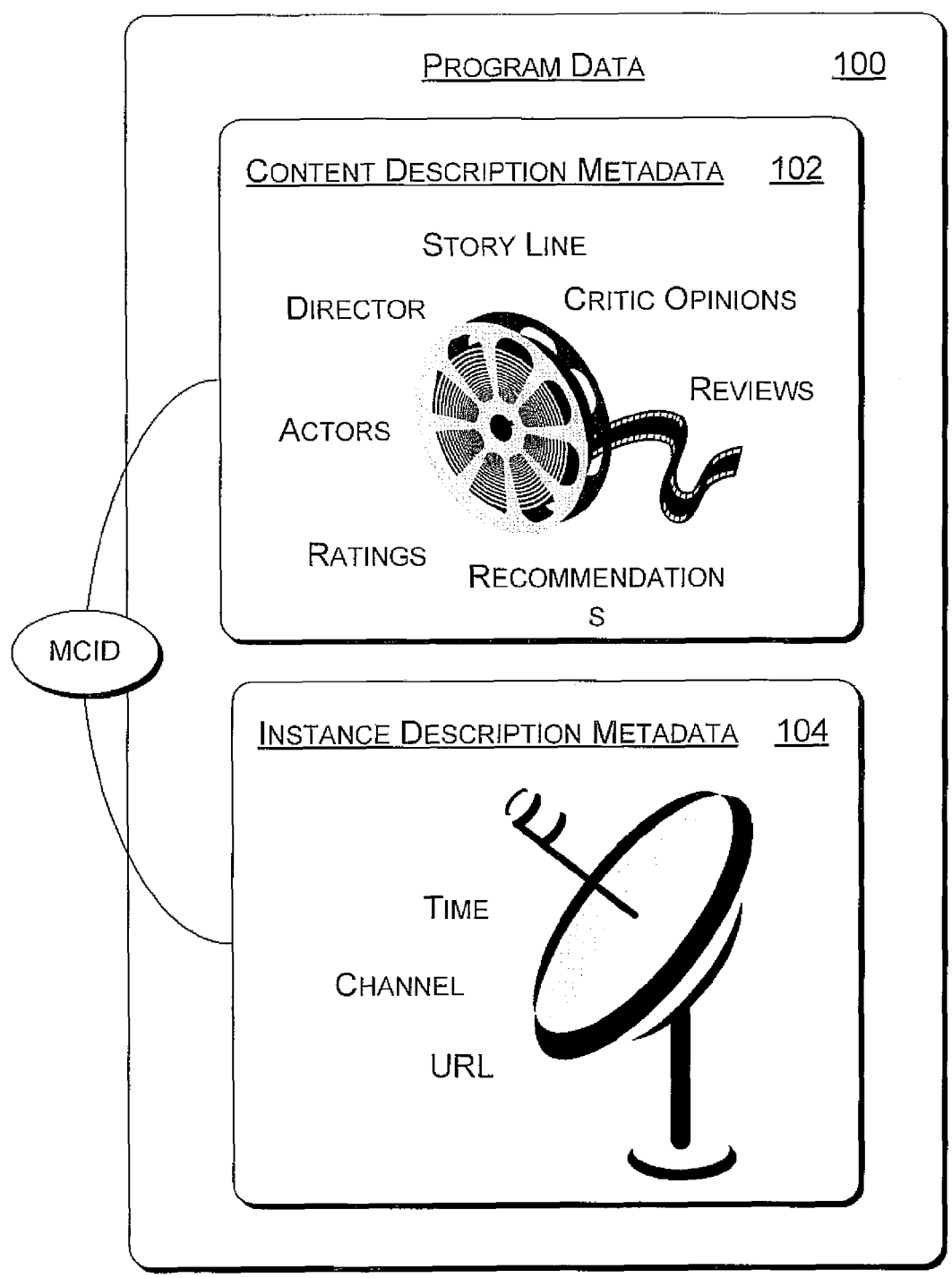
FIG. 1 is a block diagram that illustrates program data in accordance with one or more embodiments.

FIG. 1 illustrates two categories of program data 100 that can be associated with various media content (such as movies, television shows and the like) in accordance with the described embodiments. The two types of program data comprise content description metadata 102 and instance description metadata 104.

Content description metadata 102 can comprise a vast number of different types of metadata that pertain to the particular media content. The different types of content description metadata can include, without limitation, the director or producer of the content, actors in a program or movie, story line, ratings, critic opinions, reviews, recommendations, and the like.

Instance description metadata 104 comprises data that pertains to when and where the media content is available. For example, instance description metadata can include the day, time and television channel on which a particular movie or television program will be broadcast. Because content description metadata 102 is associated with the media content itself, and not when a particular instance of the media content is to be broadcast, the content description metadata can be maintained and updated throughout the life of a particular piece of media content.

In accordance with the described embodiments, the content description metadata and the instance description metadata are linked via a media content identifier number 106 or "MCID". An MCID is a unique number that is assigned to the piece of media content to identify it. The MCID can provide a basis by which the particular media content can be easily and readily identified. Once identified, metadata associated with the media content can be easily updated and extended. MCIDs can also be used to generate electronic programming guides for the users and can provide the basis by which a user's likes and dislikes are measured against media content for purposes of recommending to the user those programs that the user would most like to view.

Exemplary Environment

Figure 2:
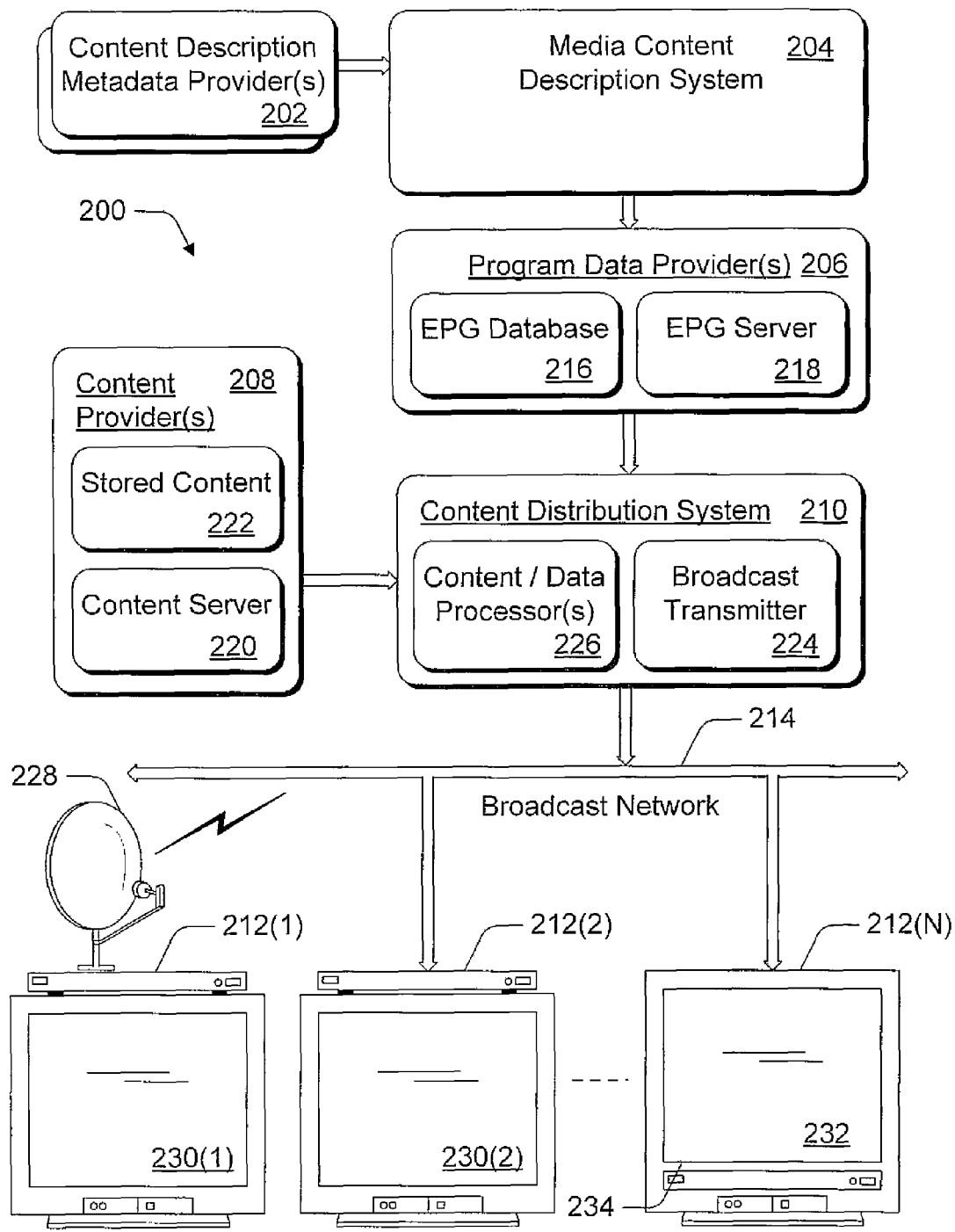
FIG. 2 is a block diagram that illustrates an exemplary environment in which methods, systems, and data structures in accordance with the described embodiments may be implemented.

FIG. 2 illustrates an exemplary environment 200 in which the methods, systems, and data structures described herein may be implemented. The environment is a media entertainment system that facilitates distribution of media content and metadata associated with the media content to multiple users. Environment 200 includes one or more content description metadata providers 202, a media content description system 204, one or more program data providers 206, one or more content providers 208, a content distribution system 210, and multiple client devices 212(1), 212(2), . . . , 212(N) coupled to the content distribution system 210 via a broadcast network 214.

Content description metadata provider 202 provides content description metadata associated with media content to media content description system 204. Example content description metadata providers can include, without limitation, movie production companies, movie distribution companies, movie critics, television production companies, program distributors, music production companies, and the like. Essentially, any person, company, system, or entity that is able to generate or supply media content description metadata can be considered a content description metadata provider 202.

Media content description system 204 stores media content description metadata associated with a plurality of metadata categories and stores metadata received from one or more metadata providers 202. In one implementation, the media content description system 204 generates composite metadata based on metadata received from a plurality of metadata providers 202. Media content description system 204 provides the media content description metadata to program data provider 206. Typically, such metadata is associated with many different pieces of media content (e.g., movies or television programs).

Program data provider 206 can include an electronic program guide (EPG) database 216 and an EPG server 218. The EPG database 216 stores electronic files of program data which can be used to generate an electronic program guide (or, "program guide"). The program data stored by the EPG database, also termed "EPG data", can include content description metadata 102 and instance description metadata 104. For example, the EPG database 216 can store program titles, ratings, characters, descriptions, actor names, station identifiers, channel identifiers, schedule information, and the like.

The EPG server 218 processes the EPG data prior to distribution to generate a published version of the EPG data which contains programming information for all channels for one or more days. The processing may involve any number of techniques to reduce, modify, or enhance the EPG data. Such processes can include selection of content, content compression, format modification, and the like. The EPG server 218 controls distribution of the published version of the EPG data from program data provider 206 to the content distribution system 210 using, for example, a file transfer protocol (FTP) over a TCP/IP network (e.g., Internet, UNIX, etc.). Any suitable protocols or techniques can be used to distribute the EPG data.

Content provider 208 includes a content server 220 and stored content 222, such as movies, television programs, commercials, music, and similar media content. Content server 220 controls distribution of the stored content 222 from content provider 208 to the content distribution system 210. Additionally, content server 220 controls distribution of live media content (e.g., content that is not previously stored, such as live feeds) and/or media content stored at other locations.

Content distribution system 210 contains a broadcast transmitter 224 and one or more content and program data processors 226. Broadcast transmitter 224 broadcasts signals, such as cable television signals, across broadcast network 214. Broadcast network 214 can include a cable television network, RF, microwave, satellite, and/or data network, such as the Internet, and may also include wired or wireless media using any broadcast format or broadcast protocol. Additionally, broadcast network 214 can be any type of network, using any type of network topology and any network communication protocol, and can be represented or otherwise implemented as a combination of two or more networks.

Content and program data processor 226 processes the media content and EPG data received from content provider 208 and program data provider 206 prior to transmitting the media content and EPG data across broadcast network 214. A particular content processor may encode, or otherwise process, the received content into a format that is understood by the multiple client devices 212(1), 212(2), . . . , 212(N) coupled to broadcast network 214. Although FIG. 2 shows a single program data provider 206, a single content provider 208, and a single content distribution system 210, environment 200 can include any number of program data providers and content providers coupled to any number of content distribution systems.

Content distribution system 210 is representative of a head end service that provides EPG data, as well as media content, to multiple subscribers. Each content distribution system 210 may receive a slightly different version of the EPG data that takes into account different programming preferences and lineups. The EPG server 218 creates different versions of EPG data (e.g., different versions of a program guide) that include those channels of relevance to respective head end services. Content distribution system 210 transmits the EPG data to the multiple client devices 212(1), 212(2), ..., 212(N). In one implementation, for example, distribution system 210 utilizes a carousel file system to repeatedly broadcast the EPG data over an out-of-band channel to the client devices 212.

Client devices 212 can be implemented in multiple ways. For example, client device 212(1) receives broadcast content from a satellite-based transmitter via a satellite dish 228. Client device 212(1) is also referred to as a set-top box or a satellite receiving device. Client device 212(1) is coupled to a television 230(1) for presenting the content received by the client device, such as audio data and video data, as well as a graphical user interface. A particular client device 212 can be coupled to any number of televisions 230 and/or similar devices that can be implemented to display or otherwise render content. Similarly, any number of client devices 212 can be coupled to a television 230.

Client device 212(2) is also coupled to receive broadcast content from broadcast network 214 and communicate the received content to associated television 230(2). Client device 212(N) is an example of a combination television 232 and integrated set-top box 234. In this example, the various components and functionality of the set-top box are incorporated into the television, rather than using two separate devices. The set-top box incorporated into the television may receive broadcast signals via a satellite dish (similar to satellite dish 228) and/or via broadcast network 214. A personal computer may also be a client device 212 capable of receiving and rendering EPG data and/or media content. In alternate implementations, client devices 212 may receive broadcast signals via the Internet or any other broadcast medium.

Each client 212 runs an electronic program guide (EPG) application that utilizes the EPG data. An EPG application enables a TV viewer to navigate through an onscreen program guide and locate television shows of interest to the viewer. With an EPG application, the TV viewer can look at schedules of current and future programming, set reminders for upcoming programs, and/or enter instructions to record one or more television shows.

Content Folders

In accordance with the embodiments described below, the notion of a content folder is employed and utilized to hold metadata that pertains to media content that can be experienced by a user. The content folder can be utilized to hold or otherwise aggregate many different types of metadata that can be associated with the media content—including the media content itself. The metadata that is provided into a content folder can come from many different metadata providers and can be provided at any time during the life of the media content.

As an example, consider the following. When media content is first created, content description metadata can be provided for the particular media content. Such content description metadata can include such things as the name of the content (such as movie or program name), actors appearing in the movie or program, year of creation, director or producer name, story line description, content rating and the like.

Figure 3:
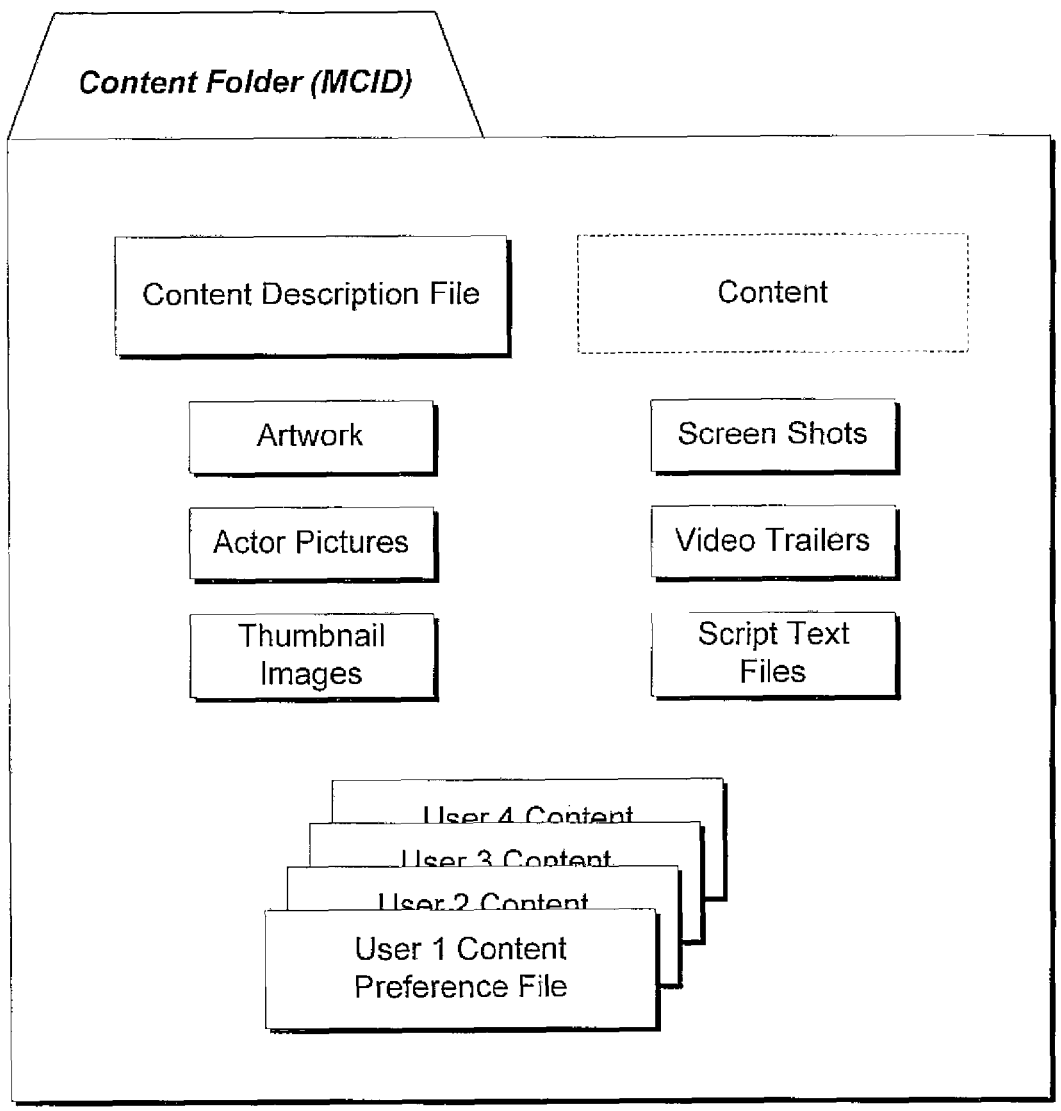
FIG. 3 is a block diagram that illustrates exemplary components of a content folder in accordance with one embodiment.

As an example, consider FIG. 3 which shows an exemplary content folder. The content folder is associated with a particular piece of content and, hence, is associated with an MCID that identifies the content. Within the content folder, many different types of metadata can be collected. For example, the content folder can include, without limitation, a content description file that describes the content (an example of which is provided below), and files associated with any artwork that might be associated with the content, actor pictures, thumbnail images, screen shots, video trailers, and script text files, to name just a few. The content folder can also contain the actual content itself, such as a digitally encoded program or movie. The content folder can, in some embodiments, contain one or more user content preference files which are described in more detail in the section entitled "User Content Preference File" below.

Over time, more content description metadata may become available and can be added to the content folder. For example, after a movie is released, critic opinions and recommendations may become available. Because this is information related to the media content itself (and not just a particular broadcast or showing of the media content), this information can be added to the content folder. At a still later point in time, additional reviews of the media content may become available and can thus be added to the content folder. Additional metadata that can be incorporated into the content folder can include such things as special promotional data associated with the content, data from fan sites, and many more different types of metadata.

Content description metadata can typically be generated by many different sources (e.g. movie production companies, movie critics, television production companies, individual viewers, etc.). A media content description system (such as system 204 in FIG. 2) can store content description metadata from the multiple sources, and can make the content description metadata available to users via one or more servers or other content distribution systems.

Figure 4:
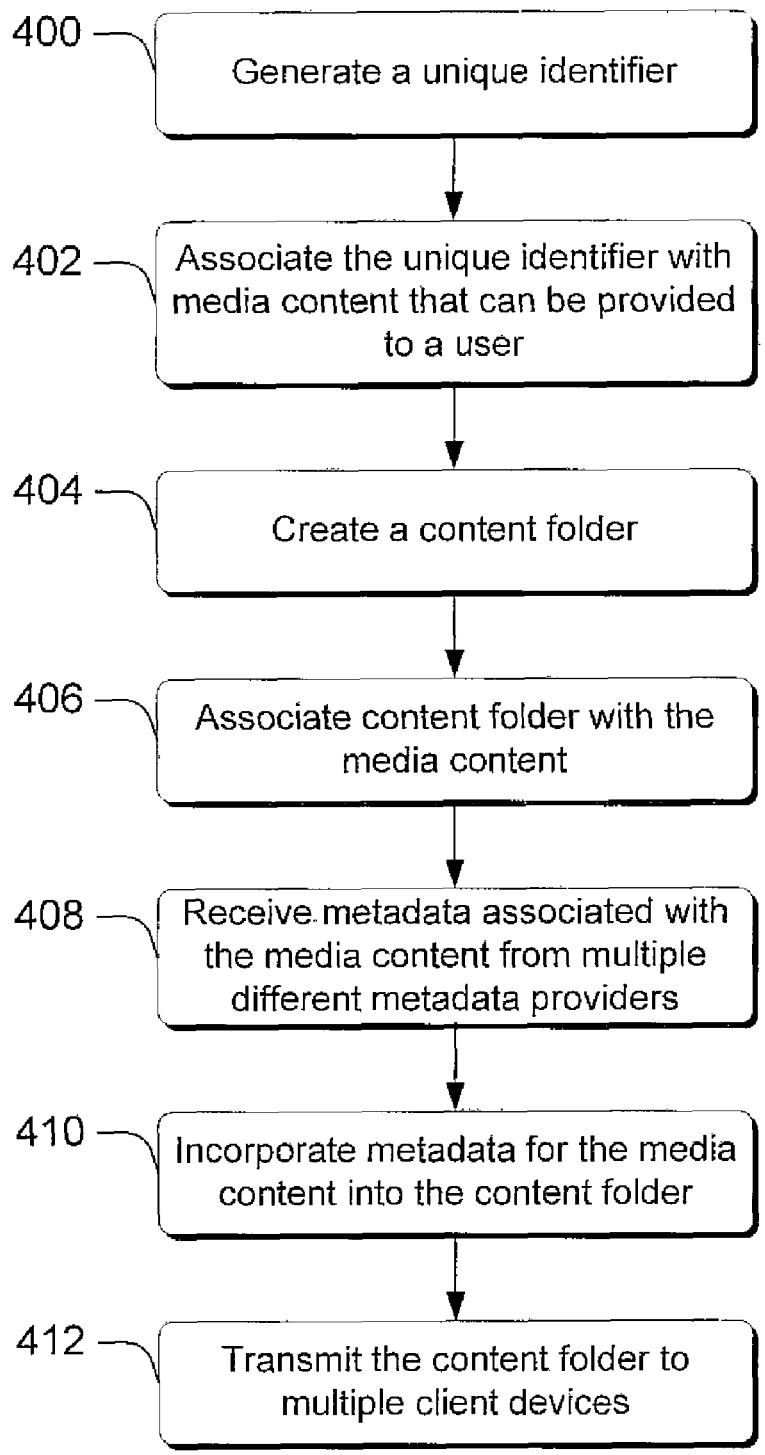
FIG. 4 is a flow diagram describing steps in a method in accordance with one embodiment.

FIG. 4 is a flow diagram that describes steps in a metadata collection method in accordance with one embodiment. The steps can be implemented in any suitable hardware, software, firmware or combination thereof. In the illustrated example, the steps can be implemented in connection with a metadata collection and transmission system. Exemplary components that can perform the functions about to be described are shown and described in connection with FIG. 2.

Step 400 generates a unique identifier and step 402 associates the unique identifier with media content that can be provided to a user. An example of such a unique identifier is described above in connection with the MCID. The media content with which the unique identifier can be associated is a specific piece of media content, such as a specific movie or television program. In practice, these steps are implemented by one or more servers or other entities in connection with a vast amount of media content. The servers or entities serve as a collection point for metadata that is to be associated with the particular media content. Step 404 creates a content folder and step 406 associates the content folder with the particular media content. These steps can also be performed by the server(s) or entities. The intent of these steps is to establish a content folder for each particular piece of media content of interest.

Step 408 receives metadata associated with the media content from multiple different metadata providers. These metadata providers need not and typically are not associated or affiliated with one another. Step 410 then incorporates the metadata that is received from the various metadata providers into the content folder that is associated with the particular media content. As noted above, this process is an ongoing process that can extend during the entire life of the particular piece of media content. The result of this step is that, over time, a very rich and robust collection of metadata is built up for each piece of media content of interest. Software executing on the server can use aggregation techniques to ascertain the best value for each program attribute using the entries from the different metadata providers. For example, different opinions as to the value of attributes can be collected from the different metadata providers. The "best" value, i.e. the one that gets sent to the client, is built by the server software using various techniques depending on the attribute type. For example, sometimes the best value is the value from the most trustworthy metadata provider. Yet other times, a vote can be taken as to the best value. Still further, for example in the case of "Degrees Of" attributes, percentages can be calculated by looking at all of the opinions from the metadata providers. Data aggregation techniques are described in some of the applications incorporated by reference above. An example of a content folder is shown and described in FIG. 3.

Step 412 transmits the content folder to multiple different client devices. This step can be implemented by transmitting all of the constituent files of the content folder, or by transmitting a pared down version of the content folder—depending on the needs and capabilities of the particular client devices to which transmission occurs.

The content folders can be used in different ways. For example, the content folder can be used in an EPG scenario to enable the EPG software on the client device to generate and render an EPG for the user. The content folder can also be used by end users to hold not only the metadata for the media content, but the media content as well.

Using Content Folders to Generate EPGs

Figure 5:
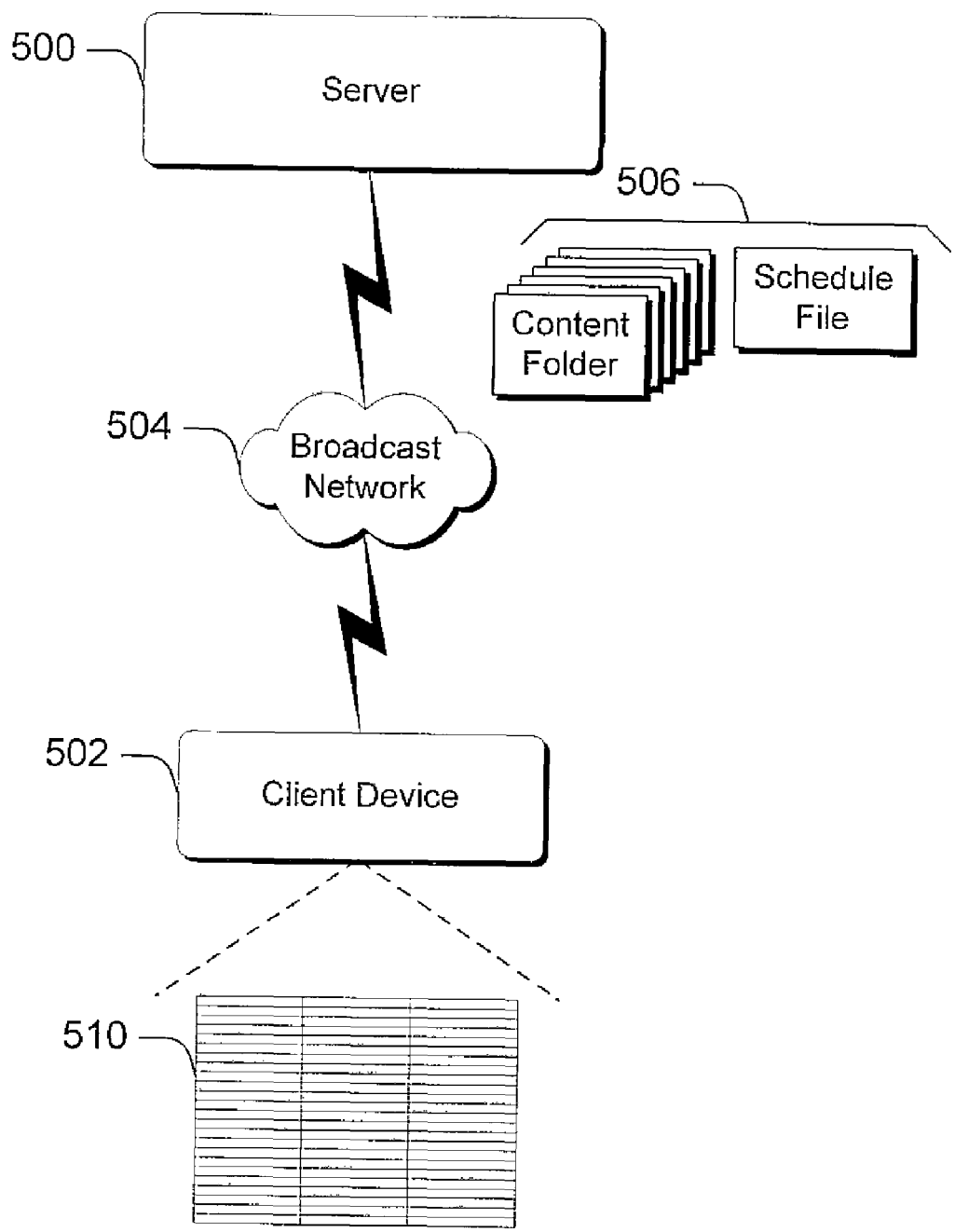
FIG. 5 is a high level block diagram that illustrates aspects of but one system that can be utilized to implement one or more embodiments.

FIG. 5 is a block diagram that can be used to understand how the client device can use the various content folders to generate an EPG. In this example, a server 500 builds and maintains many different content folders, such as the content folders that are described above. In addition, the server can build a schedule file. The content folders and schedule files are shown collectively at 506.

The schedule file is a description of the programs that are to be broadcast over a future time period for which an EPG is going to be constructed. For example, the schedule file can describe which programs are going to be broadcast for the next two weeks. Thus, the schedule file contains the instance description metadata as described in FIG. 1. The schedule file can be implemented as any suitable type of file. In this particular example, the schedule file is implemented as an XML file. The schedule file refers to the pieces of media content (i.e. programs) by way of their respective unique identifiers or MCIDs. Thus, the schedule file contains a list of MCIDs, the times when, and the channels on which the associated programs are going to be broadcast.

Figure 9:
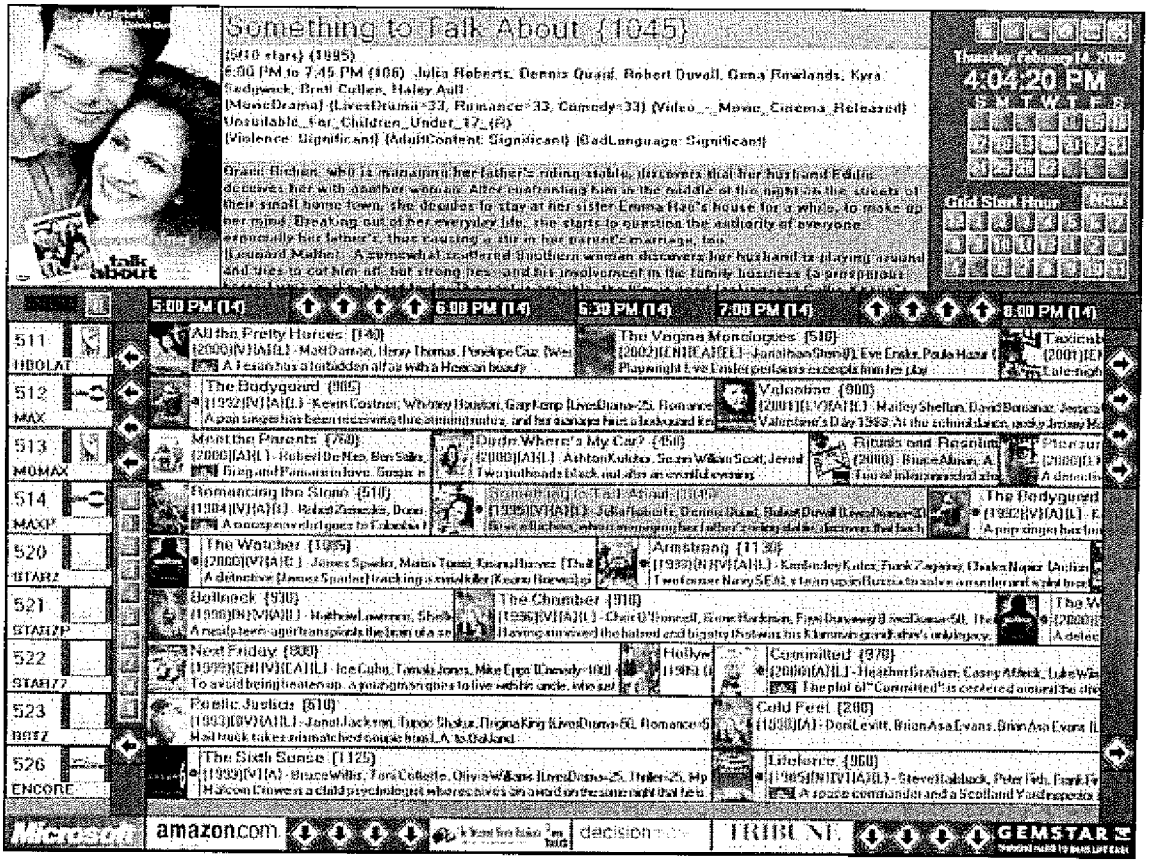
FIG. 9 is an illustration of an exemplary electronic programming guide that can be rendered in accordance with the techniques described herein.

The schedule file and content folders that correspond to the MCIDs in the schedule file are transmitted, via a suitable broadcast network 504, to multiple client devices such as client device 502. The client device can now use the schedule file and the various content folders to construct an EPG grid, such as EPG 510, for the user. A specific example of an EPG such as one that can be generated in accordance with the embodiments described herein is shown in FIG. 9.

Specifically, when the client device receives the schedule file, an EPG application executing on the client device can read the schedule file and ascertain the MCIDs that correspond to the programs that are going to be broadcast. The EPG application can then construct a suitable grid having individual cells that are to contain representations of the programs that are going to be broadcast. Each cell typically corresponds to a different MCID. To populate the grids the EPG application can access the appropriate the content folders, by virtue of the MCIDs that are associated with the content folders, and render the metadata contained in the content folder in the appropriate cell for the MCID of interest. The EPG application can also provide any user interface (UI) components that are desirable to access additional metadata that is not necessarily displayed—such as a movie trailer, a hyperlink and the like.

In one embodiment, an optimization can be employed to ensure that client devices are provided metadata within the content folder that they can use. Thus, metadata that is not necessarily useful for the client device can be excluded from the content folder that is transmitted to the client device. For example, if the client device does not have a position in its user interface to display a particular piece of information, or if the client device lacks the necessary resources to meaningfully use the metadata (e.g. the client lacks the capabilities to display a video trailer), then such metadata should not be transmitted to the client device when the content folders are transmitted. One way of implementing such an optimization is as follows. Prior to downloading the content folders, server 500 and client device 502 communicate with one another by, for example, a SOAP protocol, and the client device identifies for the server which information or metadata it is interested in. This can assist the server in assigning a class designation to the client device (e.g. thick client, thin client and/or varying degrees therebetween) so that the appropriate metadata is sent to the client.

The content folders can be used by the client device in a couple of different ways depending on the configuration and capabilities of the client device. For clients that are "thick" and support a database querying engine (such as a SQL engine), complex querying can be utilized locally on the client. In this case, certain files (such as the content description file) within the content folder can be read into the client's database and requests for program information can be sent from the EPG application to the database engine for execution. Support files such as the artwork and trailer files are not loaded into the database, but rather are read by the EPG application directly from the content folders. For clients that do not support a database engine, metadata can be read directly from the files.

Using Content Folders to Organize Metadata and Media Content

Content folders can also be used to contain not only the pertinent metadata, but the associated media content as well. This use can occur on either the server or the client side. Typically, however, this use will occur with more frequency on the client side.

Recall from FIG. 5 and the discussion above, that the client devices typically receive multiple different content folders that are individually associated with specific media content that has yet to be broadcast. Thus, as noted in FIG. 3, the client devices will typically have a number of these content folders without the associated content. When the content is acquired by the client, as by being broadcast or downloaded (for example in a Personal Video recorder application), the content itself can be added to the content folder so that individual content folders now contain not only pertinent metadata, but the corresponding content as well. Typically, such content can be digitally encoded into an appropriate file (such as an MPEG 2 file) and added to the content folder.

This can be advantageous from the standpoint of being able to abstract a specific piece of media content into an entity (i.e. the content folder) that represents not only the content itself but a potentially rich user experience made possible by the inclusion of the various types of metadata with the content. Having an abstracted entity that contains not only the content, but the associated metadata as well can be employed in the context of peer-to-peer exchanges. For example, if a user wishes to provide a piece of content to a friend, then they can simply send them the abstracted entity that includes not only the content, but all of the supporting metadata files as well.

Exemplary Client Architecture

Figure 6:
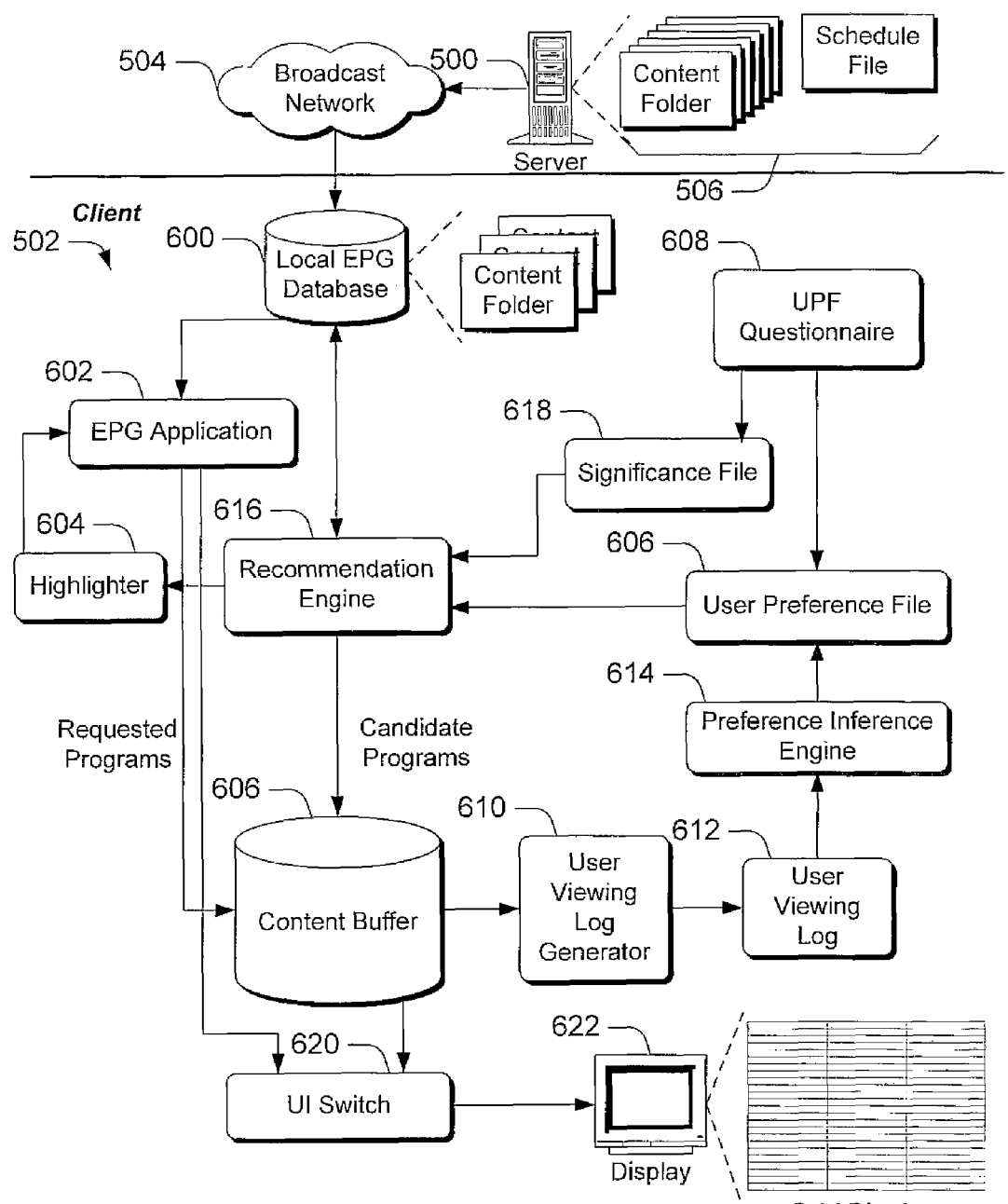
FIG. 6 is a block diagram that illustrates exemplary components of a client device in accordance with one embodiment.

FIG. 6 is a block diagram that illustrates exemplary components of a client system or device 502 in accordance with one embodiment, and expands upon the client device shown and described in FIG. 5. Client system 502 can operate as a user preference recommendation system that can score programs that are available for viewing according to a user's preferences, and recommend certain programs that meet particular conditions that are specific to a particular user.

Client system 502 can include a local electronic programming guide (EPG) database 600 that stores content folders that can include content files, support files and content description files associated with the content files that are downloaded from a server. An exemplary content description file is described in the section entitled "Content Description File" below. Database 600 can also store the schedule file. The database can comprise a traditional database such as that which would reside on a thick client. Alternately, for thin clients, the database would typically be less extensive than for thick clients.

The EPG database 600 provides data to an electronic programming guide (EPG) application 602. The EPG application 602 is configured to enable displays of program names, dates, times, lengths, etc. in a grid-like user interface. A highlighter component 604 can highlight particular programs displayed on an EPG grid. The particular programs that can be highlighted by the highlighter component 604 can be a function of a user's likes and dislikes. Client 502 also includes a content buffer 606 that can store content folders and media content associated with particular content folders.

The client 502 also includes one or more user preference files (UPF) 606 associated with a user or users of the client. The client 502 can contain more than one user preference file for each user.

The user preference file can be utilized to store values for various attributes of media content (such as television programs). Each attribute value can have a preference value associated with it that indicates how much the particular user likes or dislikes that particular attribute value in a program. Advantageously, the user preference file and the content description file can conform to a common content description schema which can facilitate matching up various programs with the user's preferences. The user preference file 606 can advantageously allow for the separation of the process of establishing user preferences, from the process of matching the user preferences with programs that are available for viewing.

Various techniques can be utilized to populate user preference file 606 with useful information about the user, such as what attribute values of television programs are liked and disliked by the user.

One way to generate a user preference file is to provide the user with a UPF questionnaire 608 that queries the user directly about which attribute values are important to the user. After the user preference file is initially constructed, it can be periodically updated with new information about preferred program attribute values. The user may, for example, simply recall the UPF questionnaire 608 and add additional information or edit information that is already in the file.

Another way to generate a user preference file makes use of a user viewing log generator 610 that monitors programs that are watched by the user or listed by the user for consumption. Program attribute values associated with the monitored programs, together with the time that the program was viewed are logged in a user viewing log 612. At predetermined intervals, a preference inference engine 614 can build up the user preference file using information contained in the user viewing log 612. User preference files are described in more detail in the section entitled "User Preference File" below.

Client 502 also includes a recommendation or matching engine 616 that drives the comparison of a particular user preference file with content description files associated with programs that are available for viewing.

When recommendation engine 616 determines that an attribute value in the user preference file matches an attribute value found in a content description file, the matching engine 616 can calculate an attribute score for the matching attribute. For example, an "actor" attribute in the user preference file may contain a value of "Steve Martin." If an "actor" attribute in the content description file also contains the value of "Steve Martin," then the "actor" attribute is designated as a matching attribute. An attribute score can then be assigned to the matching attribute, and one or more attribute scores assigned in a program can be used to calculate a program score for the program.

In one embodiment, recommendation engine 616 can make use of a significance file 618 when calculating the scores of a particular program. The significance file can contain significance values that are utilized in the calculation of program scores. Significance files are described in more detail below in the section entitled "Significance Files".

The output of recommendation engine 616 is various score-based recommendations that can be provided on a user-by-user basis. Various nuances of scoring characteristics and techniques are described below in more detail.

Client 502 can also comprise a user interface (UI) switch 620 and a display 622 such as a television or monitor on which an EPG grid can be rendered. Although the display is shown as being a part of client 502, it is to be appreciated and understood that the display can be separate from the client, such as in the case where the client is embodied in a set top box (STB). The UI switch 620 is effectively used to switch between stored programs in the content buffer 606 and live programs emanating from a content source.

Content Description Schema

As noted above, to facilitate matching attribute values that the user likes (as indicated in their user preference file) with the attribute values of the content programs (as indicated in the content description files) a comprehensive and consistent description schema is used to describe the content.

But one example of an exemplary content description schema that includes metadata categories that correspond to content attributes is described in U.S. patent application Ser. No. 10/125,260, incorporated by reference above.

User Preference File

The user preference file (UPF) is a global file that describes program attributes that the user likes. There is typically one user preference file per user, although users can have more than one user preference file for such things as representing multiple different user personas. In addition to describing the user's likes and dislikes in terms of program attributes, the user preference file can contain other global system attributes that relate to a particular user such as, for example, user interface setup options and programs the user always wishes to have recorded.

Against each program attribute is a preference number that can have a positive value (to indicate a level of desirability associated with content having that attribute), or a negative value (to indicate a level of undesirability associated with content having that attribute). In the example described below, preference numbers can range from −5 to +5.

The user preference file can be implemented in any suitable file format. In the example described below, the user preference file is implemented as an XML file and uses the same schema as the content description files (described in the section entitled "Content Description Files" below) that are used to describe the attributes of the content.

A representation of an exemplary content description schema as employed in the context of a user preference file appears directly below. This representation contains only an abbreviated selection of attributes and attribute values. Accordingly, a typical user preference file can contain more entries than those shown, and/or different attributes and/or attribute values.

---

```
<Person Entries>
    <PersonName="Julia Roberts" PersonRole="Actor" Xpref="−3"/>
    <PersonChar="Miss Marple" Xpref="+1"/>
    <PersonName="Ron Howard" PersonRole="Director" Xpref="+5"/>
...
<Person Entries>
<Title Entries>
    <TitleName="Friday 13" Xpref="+3"/>
    <TitleName="The Jerk" Xpref="+5"/>
...
<Title Entries>
...
```

---

Example User Preference File Schema

The user preference file is defined in terms of the same metadata attributes or categories that are used to describe the content in the content description files. The user preference file, however, adds one or more additional attributes that are specific to its associated user. A separate but compatible schema could be used for both the user preference file and the content description file. However, as a content description schema is an evolving concept that can add additional metadata categories over time, it is more desirable, for purposes of synchronization, to have the schemas remain synchronized. Thus, it is desirable to use the same schema for both the content description file and the user preference file.

The excerpt of the user preference file above includes tags that encapsulate various attributes and their associated values. In this specific example, "Person Entries" tags encapsulate attributes and values associated with particular individuals or characters. "Title Entries" tags encapsulates attributes and values associated with particular titles.

The "Person Entries" tag encapsulates a "Person Name" attribute that is used to identify a person such as an actor who is preferred by a particular user. A Person Name attribute value contains a character string such as an actor's name, e.g. "Julia Roberts." This indicates that the user corresponding to the particular user preference file has a preference—either a like or a dislike—for Julia Roberts in a particular context.

The "Person Entries" tag also encapsulates a "Person Role" attribute that identifies a particular function or context of the person identified in the "Person Name" attribute. This can allow a user to distinguish between actors who may also be directors in some programs. For example, the user may like movies in which Clint Eastwood stars, but may dislike movies in which Clint Eastwood directs. In this particular example, the "Person Role" attribute for Julia Roberts indicates that this entry pertains to Julia Roberts in the context of an actor, and not in some other context.

A preference attribute "Xpref=" is also provided for the "Person Name" and "Person Role" attributes and enables the user to enter a value or preference rating that indicates how much, relatively, the user likes or dislikes the value specified in the "Person Name" attribute for the context defined by the "Person Role" attribute. In this particular example, the user has indicated a value of "−3" for Julia Roberts in the context of an actor.

The "Person Entries" tag also encapsulates a "Person Character" attribute and value, as well as a preference attribute and rating associated with that "Person Character" attribute. The "Person Character" attribute enables a user to identify particular characters that the user likes or dislikes. In the present example, the Person Character attribute value comprises "Miss Marple", and the preference rating associated with that character is "+1". This indicates that the user slightly prefers programs in which this character appears.

There can be virtually any number of similar entries encapsulated by the "Person Entries" tag. For example, another "Person Name" attribute is defined for Ron Howard in the context of director and contains a preference rating of "+5", which indicates a strong preference for programs directed by Ron Howard.

Similarly, the "Title Entries" tags encapsulate "Title Name" attributes and associated values, as well as associated preference attributes and their associated ratings. In this example, a first "Title Name" attribute equals "Friday 13" having an associated preference attribute with a rating of "+2". A second "Title Name" attribute equals "The Jerk" having an associated preference attribute with a rating of "+5".

Whether attribute values actually match or not, and the extent to which attribute values match with attributes in the content description files depends on the particular entry type. For example, entry types can be used when exact matches are desired. This might be the case where a user has a particular preference for movie sound tracks in the French language. Yet other entry types can be used when an exact match is not necessarily needed or desired. Such might be the case, for example, when a user is interested in any of the movies in the "Friday the 13$^{th}$" series of movies. In this case, a match can be deemed to have occurred if the term "Friday 13" appears anywhere in the title of a movie.

Content Description File

Recall that each content folder, such as the one shown and described in FIG. 3, contains a content description file. In the present embodiment, the content description file uses the same schema as does the user preference file. The content of the files, however can be different. An exemplary portion of a content description file is provided below. The content description file can contain more entries or attributes than those shown below. For example, attributes can include a title attribute, a content identifier attribute, a date of release attribute, a running time attribute, a language attribute, and the like.

---

```
<Person Entries>
    <PersonName="Russell Crowe" PersonRole="Actor"/>
    <PersonChar="John Nash"/>
<Person Entries>
<Title Entries>
    <TitleName="A Beautiful Mind"/>
<Title Entries>
```

Example Content Description File Schema

Accordingly, the "Person Entries" tag includes a "Person Name" attribute and value that are used to identify individuals associated with the content. In this particular case, the attribute can be used to designate actors appearing in a particular program. The "Person Entries" tag also includes a "Person Role" attribute and value that identifies a particular function or context of the person identified in the "Person Name" attribute. In this particular example, the "Person Name" and "Person Role" attributes for the content indicates that Russell Crowe is associated with the program in the context of an actor.

The "Person Entries" tag also encapsulates a "Person Character" attribute and value. The "Person Character" attribute identifies particular characters that appear in the program or movie. In the present example, the Person Character attribute value comprises "John Nash".

Similarly, the "Title Entries" tags encapsulate a "Title Name" attribute and associated value which designates the title of the content. In this example, the "Title Name" attribute equals "A Beautiful Mind".

As noted above, the user preference file and the content description file contain many of the same attributes. This is due to the fact that the files utilize the same content description schema to describe content attributes. This greatly facilitates the process of matching program attributes with a user's preferred attributes.

User Content Preference File

Various embodiments can also make use of user content preference files. A user content preference file is different from a user preference file. Recall that a user preference file is a global file that describes attributes that a user likes and dislikes. A user content preference file, on the other hand, is not a global file. Rather, the user content preference file is associated with each particular piece of content for each user or user preference file. The user content preference files are maintained in the content folder and describe how well a particular piece of content matches up with an associated user preference file. So, for example if there are four users who use the particular client device, then there should be four User Preference Files that describe each user's likes and dislikes. For each content folder in the client system, then, there should be four User Content Preference files—one for each user describing how well this particular content matches up with the user's likes and dislikes.

User Content Preference files can facilitate the processing that is undertaken by the recommendation engine. Specifically, because of the large number of content folders, user preference files and the like, a recommendation engine can take a long time to execute. In practice, the recommendation engine is executed as a batch process. The results of the recommendation engine can be stored in the user content preference file so that they can be accessed by whatever application may need them.

In addition to indicating how well the particular content matches up with a user's user preference file, the user content preference file can include additional user-specific data that is particular to that piece of content. For example, if the user is a film buff and always wants to ensure that these particular movies are shown in a particular aspect ratio or using Dolby surround sound, such information can be located in the User Content Preference file.

The User Content Preference files can be used to generate human-readable reports that describe how the recommendation engine arrived at a particular score. This can be a desirable feature for more sophisticated users that can assist them in adjusting, for example, their program attribute preferences to refine the recommendations produced by the recommendation engine.

Significance File

Some program attribute matches that are found by the recommendation engine can be more important or significant than others. Significance values, as embodied in a significance file such as significance file 618 in FIG. 6, provide a way for the system to appropriately weight those things that are truly significant to a particular user.

A significance file is a global file that is used to store significance values that correspond to each attribute available in a program. Each significance value denotes a relative importance of the attribute with which it corresponds as compared to the other attributes. Use of significance values provides an appropriate weighting factor when determining whether a program should be recommended to a user or not. That is, when a recommendation engine compares a user's preference file with a content description file and finds a match between particular attribute values, the recommendation engine can multiply the preference rating for the matching attribute in the user's preference file with the corresponding significance value for that attribute in the significance. The product of this operation can then contribute to the overall score of a particular program for purposes of determining whether a recommendation should be made or not.

In accordance with one embodiment, the significance file uses the same schema as the content description file (so that everything stays in synch), and extends the schema by including an additional attribute ("XSignif") that enables the user to express the significance of a particular attribute of the content description file. As an example, consider the excerpted portion of a significance file that appears directly below.

```
<Person Entries>
    <PersonName="" XSignif="63"/>
    <PersonChar="" XSignif="87"/>
<Person Entries>
<Title Entries>
    <TitleName="" XSignif="99"/>
<Title Entries>
```

Example Significance File Schema

The above significance file excerpt includes a "Person Entries" tag and a "Title Entries" tag. These tags encapsulate many of the same attributes that appear in the user preference file and content description file.

Specifically a "Person Name" attribute is encapsulated by the "Person Entries" tag. Associated with the "Person Name" attribute is a significance attribute "XSignif" that is used to define the relative importance of a person associated with a particular piece of content as compared with other attributes. In this example, a significance value of "63" is assigned to the "Person Name" attribute. Assuming for purposes of this example that significance values range from zero to one hundred, a value of "63" indicates that a match of this attribute is generally important to the user.

A "Person Character" attribute is also encapsulated by the "Person Entries" tag, and the corresponding significance attribute "XSignif" of "87" indicates that a match of this attribute is more important to the calculation of the program score than a match of the "Person Name" attribute.

A "Title Name" attribute is encapsulated by the "Title Entries" tag and, in this example, an associated significance attribute "XSignif" of "99" indicates that a match of this attribute is even more important than a match of the "Person Character" attribute.

It should be noted that the significance values could be stored in the user preference files along with each entry therein, thereby making the significance values user specific rather than system wide. They could even be associated with the particular preferences, however, doing so would require redundant entries since some attributes may be repeated with different attribute values. For example, a user preference file may include fifty actors' names that a user prefers to see. If the significance values were to be included in the user preference file associated with particular preferences, then each of the fifty entries for actors' names would have to include the same significance value. Thus, by virtue of the fact that the significance file is a global file, such redundancies can be avoided.

Additionally, it should be appreciated that it is not necessary for the user to create and/or have control over the significance file. Rather, another entity such as a content provider may assign the significance values for a particular client system. While such an implementation would not provide as close a fit with each user's personal preferences, it would relieve the user from having to individually do the work.

As an example of how a client device or system can employ a significance file and significance values, consider the following. Assume that in a user's preference file the user includes the same rating or preference value (e.g. +5) for the "Title Name" and "Person Character" attributes. For example, perhaps the "Title Name" of concern is the "Seinfeld" show and the "Person Character" of interest is the Kramer character. Thus, in this instance, the user really likes the Seinfeld show and the Kramer character. Notice in the excerpted portion of the significance file that appears above, the "Title Name" attribute has a significance value of "99", while the "Person Character" attribute has a significance value of "87". Thus, although the user may enter the same preference value for the Title Name attribute value and the Person Character attribute value (i.e. +5) because the user strongly prefers both, all other things being equal, by using the significance file the system would determine that this user prefers a Seinfeld episode that features the Kramer character (with a corresponding score of 5*87+5*99 930) over a Seinfeld episode that does not feature the Kramer character (with a corresponding score of 5*99=495).

For many of the program attribute types, the significance file can have multiple numbers, each tagged with the type of match to which they relate. The most commonly used tags can be "Full" and "Part" which refer respectively to a full match or just a partial match. Finding a keyword within a plot abstract is an example of a partial match.

Running the Recommendation Engine

Typically, the recommendation engine is run or otherwise executed for every piece of content for every user on the client system. Needless to say, this can involve a fairly large amount of processing for the client system. Various strategies can be used on the client to effectively hide this processing time. This can be particularly important in the context of client devices that do not employ high end processors.

Figure 7:
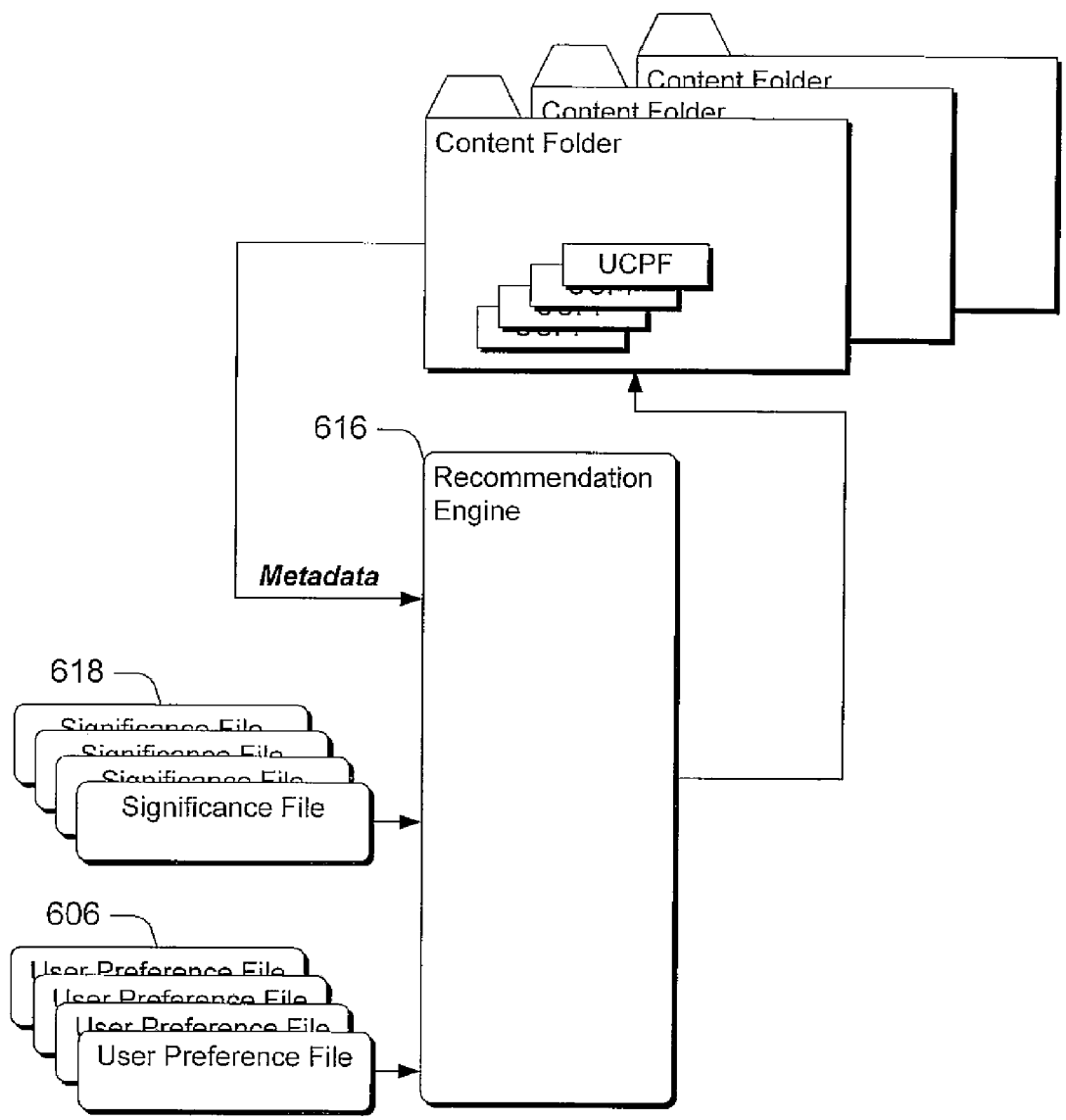
FIG. 7 is a block diagram that illustrates a recommendation engine in accordance with one embodiment.

As an example, consider FIG. 7 which illustrates, in somewhat more detail, the processing that can take place at the recommendation engine 616. Typically, there are a number of different inputs to the recommendation engine. Here, the inputs can include the metadata from each of the content folders, the input from each user's associated significance file 618, and the input from each user's preference file 606. For each piece of content that the client receives (i.e. for each content folder), the recommendation engine is run with these inputs. The recommendation engine 616 processes inputs and then provides an output that includes, among other things, the scores for the various programs, for each user, that are slated for broadcasting during the next period of time. This data can be provided by the recommendation engine into user content preference files (UCP files) that are contained in each of the content folders. Additionally, the recommendation engine's output is also used to make recommendations for the various users via the EPG that is generated and displayed for the users. Those programs that more closely match a particular user's likes can be displayed more prominently than those programs that do not closely match a user's likes.

In accordance with one embodiment, recommendation engine 616 can be run or executed as the content description information (i.e. the content folders) are downloaded from the server. Downloading of the content folders can be scheduled such that the content folders are downloaded at a time when the users are not likely to be using the client system, e.g. very early in the morning. Typically, content folders that are downloaded are associated with content that is to be broadcast up to a couple of weeks into the future. Downloads can be scheduled for once a day such that if for some reason a download does not happen on a particular day, the next day's download can catch up. In practice, it is usually sufficient for downloads to occur at least once a week so that the user's experience is not disrupted. Accordingly, scheduling downloads for every day can provide plenty of room to account for such things as bandwidth limitations and the like.

Thus, typically, the recommendation engine can be scheduled to run every night. In some situations, it can be desirable to immediately run the recommendation engine if, for example, something in the client system changes that would make running the recommendation engine desirable. For example, assume that a user is watching a particular program and something or someone in the program catches their eye. Perhaps they notice a new actor whom they really like. The user may opt to update their user preference file to reflect that they would like to have more recommendations made for any programs in which this particular actor appears. Here, then, it can be desirable to immediately run the recommendation engine to incorporate the user's new changes in their user preference file. This can provide the user with immediate feedback and recommendations. In practice, however, this may be unnecessary because the user's change may not necessarily change the overall scores very much.

Sorting the Scores

During the download of content description data (i.e. content folders), recommendation engine 616 calculates a score for each program. At the end of the complete process, the recommendation engine can sort the scores for all of the programs so that it is later able to display a sorted list of recommendations to the user. This list of sorted scores can be kept in a separate scores file. The scores file can include a list of the MCIDs for each of the programs and the corresponding score for each MCID. Each user can have a separate scores file that contains their own scores for the various programs. Using only an MCID is sufficient in this case because with the MCID, all other relevant information pertaining to a particular program can be accessed.

The scores file can be stored as part of the user preference file, or in an accompanying file that is associated with the user. The latter would go far to ensure that the user preference file does not become too bloated.

Privacy Issues

Because the user preference files and scores files contain sensitive information, various protections can be utilized to ensure that the user preference files and, if a separate file—the scores files—are protected.

To protect the user preference and scores files, the files can be encrypted and access to the files can be via password. Any suitable encryption techniques can be utilized such as DES or AES security techniques. Other methods of protection can be utilized such as storing the files on a removable smartcard.

Relative Scoring

As noted above, each program that is to be broadcast in a forthcoming schedule is given a score by the recommendation engine. The actual score that each program receives is not as important as the score's significance relative to all of the other scores. That is, it is more useful to assess the scores of each program relative to the scores for the other programs. Thus, it can be advantageous to translate each program's actual score into a relative score so that its importance to the individual users can be ascertained relative to the other programs that are to be broadcast.

In accordance with one embodiment, the recommendation engine computes a score for each of the programs that are to be broadcast. The recommendation engine then takes this score and computes a relative score that provides a measure of how one particular program relates all of the other programs that are to be broadcast. One way of computing a relative score is to divide each program's individual score by the highest score found for any program in the forthcoming schedule. To facilitate this calculation, the recommendation engine can, at the conclusion of the download and metadata matching processes, determine the highest score and save this score in a global location, e.g. in a particular user's user preference file. As further individual scores are computed for each of the programs for each of the users, each program's relative score can be computed as well.

It can be advantageous to translate each program's relative score into a useful visual display that can be readily utilized by a user for selecting programs. For example, a star rating system can be utilized. One way of implementing a star rating system can be as follows. Programs that receive a negative score (and hence are not desirable from a user's standpoint) will not receive a recommendation star. Similarly, programs that receive scores that are less than typically about half of the highest score will not receive a recommendation star. Various thresholds can be used to ascertain how many stars a program is to receive. It can be desirable for the thresholds associated with the different star ratings to be user programmable so that individual users can define how stars are to be assigned. As an example, consider the following exemplary threshold settings and associated stars:

| | |
|---|---|
| 0-50% (and negative scores) | No star |
| 50-60% | One star |
| 60-70% | Two stars |
| 70-80% | Three stars |
| 80-90% | Four stars |
| 90-100% | Five stars |

Content Artwork

As noted above, particularly with reference to FIG. 3, each content folder can contain artwork files that can be used to render content-specific displays on a generated EPG. For example, the Star Wars movie might have an artwork file that contains a picture of Luke Skywalker and Hans Solo. There will inevitably, however, arise situations where a particular content folder associated with a piece of content may not have an artwork file. In this case, it would still be desirable to insert some image that is identified in some way with the content if for no other reason than to provide the user with a visual cue as to the nature of the content. In these situations and in accordance with one embodiment, if no content specific image or artwork is available, the system can use the genre for the particular program and display a generic image associated with that genre. For example, if the program happens to be a golf tournament, then a suitable generic image may be that of a golf club and golf ball. Similarly, if the program happens to be a romantic drama, then a suitable generic image may be that of a rose.

For this purpose, the system can maintain a default image collection having default images for each of the few hundred genre categories that are possible. The result is that a meaningful image for each of the EPG cells can be provided in the Electronic Program Guide and in any recommendation lists that are generated.

Exemplary Computer Environment

Figure 8:
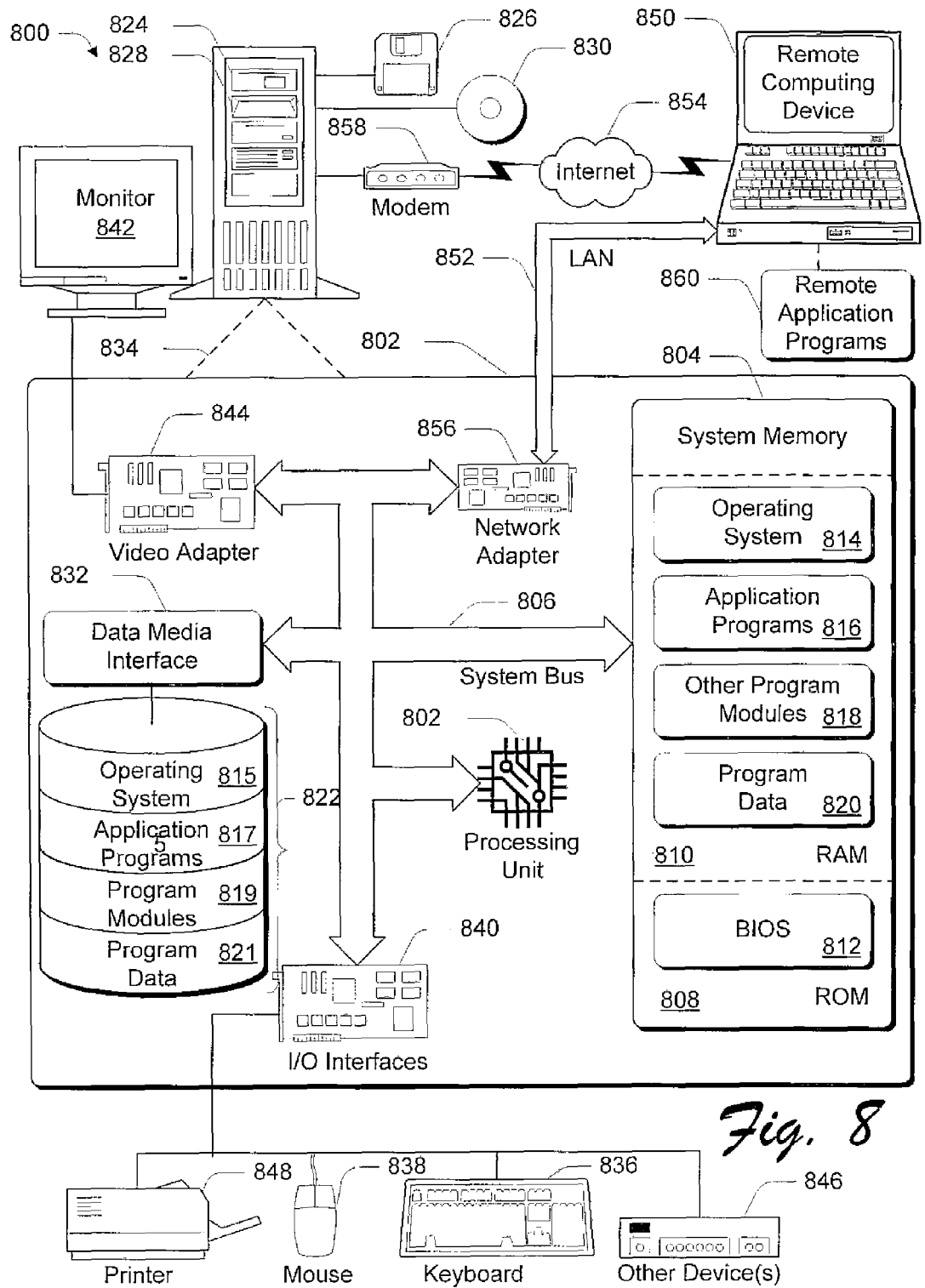
FIG. 8 is a block diagram that illustrates various components that can comprise a client device.

The various components and functionality described herein can be implemented with a number of individual computers that serve as client devices. FIG. 8 shows components of a typical example of such a computer generally at 800. The components shown in FIG. 8 are only examples, and are not intended to suggest any limitations as to the scope of the claimed subject matter.

Generally, various different general purpose or special purpose computing system configurations can be used. Examples of well known computing systems, environments, and/or configurations that may be suitable for use in implementing the described embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various functionalities of the different computers can be embodied, in many cases, by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 800 may include, but are not limited to, a processing unit 802, a system memory 804, and a system bus 806 that couples various system components including the system memory to the processing unit 802. The system bus 806 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 800 typically includes a variety of computer-readable media. Computer-readable media can be any available media that can be accessed by computer 800 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 800. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 804 includes computer storage media in the form of volatile and/or nonvolatile memory such as read only memory (ROM) 808 and random access memory (RAM) 810. A basic input/output system 812 (BIOS), containing the basic routines that help to transfer information between elements within computer 800, such as during start-up, is typically stored in ROM 808. RAM 810 typically contains data and/or program modules that are immediately accessible to and/or presently being operated on by processing unit 802. By way of example, and not limitation, FIG. 8 illustrates operating system 814, application programs 816, other program modules 818, and program data 820.

The computer 800 may also include other removable/non-removable, volatile/nonvolatile computer storage media. By way of example only, FIG. 8 illustrates a hard disk drive 822 that reads from or writes to non-removable, nonvolatile magnetic media, a magnetic disk drive 824 that reads from or writes to a removable, nonvolatile magnetic disk 826, and an optical disk drive 828 that reads from or writes to a removable, nonvolatile optical disk 830 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 822 is typically connected to the system bus 806 through a non-removable memory interface such as data media interface 832, and magnetic disk drive 824 and optical disk drive 828 are typically connected to the system bus 806 by a removable memory interface such as interface 834.

The drives and their associated computer storage media discussed above and illustrated in FIG. 8 provide storage of computer-readable instructions, data structures, program modules, and other data for computer 800. In FIG. 8, for example, hard disk drive 822 is illustrated as storing operating system 815, application programs 817, other program modules 819, and program data 821. Note that these components can either be the same as or different from operating system 814, application programs 816, other program modules 818, and program data 820. Operating system 815, application programs 817, other program modules 819, and program data 821 are given different numbers here to illustrate that, at a minimum, they are different copies. A user may enter commands and information into the computer 800 through input devices such as a keyboard 836 and pointing device 838, commonly referred to as a mouse, trackball, or touch pad. Other input devices (not shown) may include a microphone, joystick, game pad, satellite dish, scanner, or the like. These and other input devices are often connected to the processing unit 802 through an input/output (I/O) interface 840 that is coupled to the system bus, but may be connected by other interface and bus structures, such as a parallel port, game port, or a universal serial bus (USB). A monitor 842 or other type of display device is also connected to the system bus 806 via an interface, such as a video adapter 844. In addition to the monitor 842, computers may also include other peripheral output devices 846 (e.g., speakers) and one or more printers 848, which may be connected through the I/O interface 840.

The computer may operate in a networked environment using logical connections to one or more remote computers, such as a remote computing device 850. The remote computing device 850 may be a personal computer, a server, a router, a network PC, a peer device or other common network node, and typically includes many or all of the elements described above relative to computer 800. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 800 is connected to the LAN 852 through a network interface or adapter 856. When used in a WAN networking environment, the computer 800 typically includes a modem 858 or other means for establishing communications over the Internet 854. The modem 858, which may be internal or external, may be connected to the system bus 806 via the I/O interface 840, or other appropriate mechanism. In a networked environment, program modules depicted relative to the computer 800, or portions thereof may be stored in the remote computing device 850. By way of example, and not limitation, FIG. 8 illustrates remote application programs 860 as residing on remote computing device 850. It will be appreciated that the network connections shown are exemplary and other means of establishing a communications link between the computers may be used.

Exemplary Electronic Program Guide

FIG. 9 shows an exemplary electronic program guide that can be provided in accordance with the above-described techniques.

Conclusion

The systems and methods described above can provide a way to accurately evaluate and recommend programs to a user that the user is likely to prefer over other programs that have been culled in the process. The user is no longer faced with spending an inordinate amount of time researching available programs manually and, as a result, missing a great deal of programming. The user is also spared from having to endure inaccurate recommendations that waste the user's time. The techniques described herein can provide a user with a more enjoyable multimedia experience that is specifically tailored to the individual.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A system comprising:

a processor;

memory communicatively coupled to the processor; and a recommendation engine, stored in the memory and executed on the processor, configured to:

receive data associated with and describing media content that is to be broadcast, the data associated with the media content being updated as additional information pertaining to the media content becomes available, the data associated with the media content including part of a content folder that contains metadata that describes the media content and one or more attributes associated with the media content that defines an individual associated with the media content;

receive data that defines user media content preferences;

provide, into individual content folders, one or more user content preference files that describe how well a particular piece of media content matches with the user media content preferences;

process the received data to calculate a score for individual pieces of media content that is to be broadcast; and make recommendations to one or more users based upon the calculated scores for the individual pieces of media content.

2. The system of claim 1, wherein the recommendation engine is further configured to receive one or more significance files, each of the one or more significance files defining a relative importance of a plurality of attributes for which a match can be determined between the data associated with media content to be broadcast and the data that defines user media content preferences.

3. The system of claim 2, wherein the one or more significance files define a relative importance for different types of matches, at least one type of match comprising a partial match, and at least another type of match comprising a full match.

4. The system of claim 1, wherein:

the data associated with media content that is to be broadcast includes one or more content description files;

the data that defines user media content preferences includes one or more user preference files; and the one or more content description files and the one or more user preference files each conform to a common schema.

5. The system of claim 1, wherein the data that defines user media content preferences comprises:

a first attribute of the one or more attributes that includes a character string that defines the individual associated with the media content; and one or more attribute values, each particular attribute value corresponding to a particular one of the one or more attributes, each of the one or more attribute values defining a user's preference for the particular one of the one or more attributes to which the particular attribute value corresponds, wherein a first attribute value of the one or more attribute values corresponds to the first attribute and includes a numerical value that indicates an extent to which a user prefers the individual.

6. The system of claim 1, wherein the data that defines user media content preferences includes one or more user preference files, each each user preference file including data that defines a particular user's media content preferences, the one or more user preference files includes files that are:

global;

hierarchical;

tag-based; and protected.

7. A method comprising:

receiving descriptive data associated with media content that is to be broadcast to a client device;

receiving data that defines user preferences that pertain to media content that is to be broadcast, the data that defines the user preferences comprising (1) at least one user preference file, the user preference file including a hierarchical, tag-based file that contains data that defines the user preferences, and (2) at least one significance file, the significance file including a hierarchical, tag-based file that contains data that defines a relative importance of a corresponding attribute for which a match can be determined between the media content and the user preferences, the user preference file being based at least in part on a user viewing log created by monitoring media content watched by the user, and the user preference file including one or more tag-encapsulated attributes that are associated with the media content and attribute values that define the user preferences, the attribute values including character strings that define individuals associated with the media content and character strings that define contexts that pertain to the individuals associated with the media content;

processing the received data to calculate a score for individual pieces of media content that are to be broadcast; and based upon one or more calculated scores, making media content recommendations to one or more users of the client device.

8. The method of claim 7, wherein the user preference file comprises one or more tag-encapsulated attributes that are associated with the media content and attribute values that define the user preferences, the attribute values including positive and negative numerical values that indicate an extent to which a user prefers a particular attribute.

9. A system comprising:
a processor;
memory communicatively coupled to the processor; and
a recommendation engine, stored in the memory and executed on the processor, that is configured to:
  process an XML content description file containing data associated with and describing media content that is to be broadcast to a client device;
  process one or more XML user preference files containing data that defines user preferences for one or more users; and
  process one or more XML significance files that define(s), for individual users, significance values that are used to calculate, along with the data in the XML user preference file(s), scores for individual pieces of media content that is to be broadcast, the recommendation engine further being configured to generate one or more reports that describe how the scores were calculated;
  calculate, for each program or movie that is to be broadcast and each user, a score based upon the data contained in the XML content description file, the XML user preference file and the XML significance file, and make recommendations to one or more of the users based upon the calculated scores for the individual pieces of media content; and
  calculate a relative score for each piece of media content, the relative score reflecting the media content's score relative to scores for other media content, the relative score being computed based on each media content's score and a high score attained for the individual pieces of media content.

10. The system of claim 9, wherein the recommendation engine is configured to enable an electronic program guide to be generated that contains individual user recommendations associated with individual pieces of media content.

11. The system of claim 9, wherein the recommendation engine is configured to provide data, for each piece of media content, into a user content preference file that describes, for that piece of the media content, how well the piece of media content matches up with an associated user preference file for an associated user.

12. The system of claim 9, wherein the recommendation engine is configured to calculate scores as the content description files are downloaded from a server.

13. The system of claim 9, wherein the recommendation engine is configured to calculate scores as the content description files are downloaded from a server, the recommendation engine being configured to calculate scores responsive to a user making a change to an associated user preference file.

14. The system of claim 9, wherein the recommendation engine is configured to sort calculated scores for each user and provide the sorted scores into a separate scores file for each user.

15. The system of claim 9, wherein the recommendation engine is configured to further calculate a relative score for each piece of media content, the relative score reflecting the media content's score relative to scores for other media content.

16. The system of claim 9, wherein the recommendation engine is configured to further calculate a relative score for each piece of media content, the relative score reflecting the media content's score relative to scores for other media content, the recommendation engine being configured to enable a visual display of the relative score for individual pieces of media content to be provided in an electronic program guide that is rendered.

17. The system of claim 9, wherein the recommendation engine is configured to further calculate a relative score for each piece of media content, the relative score reflecting the media content's score relative to scores for other media content, the recommendation engine being configured to enable a threshold-based, visual display of the relative score for individual pieces of media content to be provided in an electronic program guide that is rendered.

* * * * *